(12) United States Patent
Striker et al.

(10) Patent No.: US 8,337,939 B2
(45) Date of Patent: Dec. 25, 2012

(54) METHOD OF PROCESSING A CERAMIC LAYER AND RELATED ARTICLES

(75) Inventors: Todd-Michael Striker, Guilderland, NY (US); Venkat Subramaniam Venkataramani, Clifton Park, NY (US); James Anthony Ruud, Delmar, NY (US)

(73) Assignee: General Electric Company, Niskayuna, NY (US)

( * ) Notice: Subject to any disclaimer, the term of this patent is extended or adjusted under 35 U.S.C. 154(b) by 1415 days.

(21) Appl. No.: 11/854,702

(22) Filed: Sep. 13, 2007

(65) Prior Publication Data

US 2009/0075146 A1 Mar. 19, 2009

(51) Int. Cl.
 *C23C 26/00* (2006.01)
(52) U.S. Cl. ............................ 427/58; 427/115; 427/215
(58) Field of Classification Search .................... 427/58, 427/115, 215
 See application file for complete search history.

(56) References Cited

U.S. PATENT DOCUMENTS

| | | | | |
|---|---|---|---|---|
| 4,517,260 | A * | 5/1985 | Mitsuda | 429/498 |
| 5,358,735 | A | 10/1994 | Kawasaki et al. | |
| 6,858,045 | B2 | 2/2005 | Chen et al. | |
| 7,153,611 | B2 * | 12/2006 | Minami et al. | 429/304 |
| 2002/0155227 | A1 | 10/2002 | Damani et al. | |
| 2005/0238796 | A1 | 10/2005 | Armstong et al. | |

OTHER PUBLICATIONS

C.J. Li et al.; "Effect of densification processes on the properties of plasma-sprayed YSZ electrolyte coatings for solid oxide fuel cells"; Surface & Coatings Technology 190 (2005) 60-64.
Todd-Michael Striker et al.; "Ceramic Electrolyte Structure and Method of Forming; and Related Articles"; Pending U.S. Appl. No. 11/565,236, filed Nov. 30, 2006.
Todd-Michael Striker et al.; "Composite Ceramic Electrolyte Structure and Method of Forming; and Related Articles"; Pending U.S. Appl. No. 11/755,044, filed May 30, 2007.

\* cited by examiner

*Primary Examiner* — Stuart Hendrickson
(74) *Attorney, Agent, or Firm* — Francis T. Coppa

(57) ABSTRACT

A method of processing a ceramic layer is provided. The method comprises the steps of providing a ceramic layer comprising a plurality of microcracks; infiltrating at least some of the plurality of microcracks with a liquid precursor comprising at least one oxidizable metal ion; and exposing the ceramic layer to a base having a pH value of at least about 9, so as to chemically convert the oxidizable metal ion into an oxide, thereby decreasing the porosity of the ceramic layer. A solid oxide fuel cell is provided. The solid oxide fuel cell comprises an anode; a cathode; and a ceramic electrolyte disposed between the anode and the cathode. The ceramic electrolyte is processed by the method comprising the steps of providing a ceramic electrolyte comprising a plurality of microcracks; infiltrating at least some of the plurality of microcracks with a liquid precursor comprising at least one oxidizable metal ion; and exposing the ceramic electrolyte to a base having a pH value of at least about 9, so as to chemically convert the oxidizable metal ion into an oxide, thereby decreasing the porosity of the ceramic electrolyte.

27 Claims, 3 Drawing Sheets

METHOD OF PROCESSING A CERAMIC LAYER AND RELATED ARTICLES

BACKGROUND OF THE INVENTION

The invention is related to a method of processing a ceramic layer. The invention is also related to devices made therefrom.

Thermal spray processes, such as air plasma spray, have been extensively used to fabricate ceramic layers. These processes have the potential to provide large-area ceramic layers at reasonably low manufacturing costs. Therefore, air plasma spray could be used in the commercial manufacture of ceramic electrolytes for use in solid oxide fuel cells. However, air-plasma-sprayed coatings typically contain both pores and microcracks, which in the case of a ceramic electrolyte may provide leak paths for the fuel and air.

Microcracks are typically formed at interlamellar splat boundaries during deposition, or are formed through the thickness of the coating, due to large thermal expansion strains caused during processing and operation. Such defects may limit the open cell voltage and fuel utilization. Efforts are being made to increase the density of deposited ceramic electrolyte layers, and to minimize their defects, but most of them involve high processing temperatures. When the ceramic electrolyte layers are disposed on metals at high processing temperatures, high oxygen partial pressures may lead to unwanted oxidation. Oxidation and thermal cycling may also cause serious problems, including delamination of the electrolyte. Therefore, there is a continuous need to improve the performance of ceramic electrolytes, and a need for versatile methods to fabricate ceramic electrolytes having substantially reduced permeability.

BRIEF DESCRIPTION OF THE INVENTION

The present invention meets these and other needs by providing a method of processing a ceramic electrolyte to facilitate substantial reduction in permeability, involving low processing temperatures and with minimum amount of thermal cycling.

One embodiment of the invention is a method to process a ceramic electrolyte. The method comprises the steps of providing a ceramic layer comprising a plurality of microcracks; infiltrating at least some of the microcracks with a liquid precursor comprising at least one oxidizable metal ion; and exposing the ceramic layer to a base having a pH value of at least about 9, so as to chemically convert the oxidizable metal ion into an oxide, thereby decreasing the porosity of the ceramic layer.

Another embodiment is a solid oxide fuel cell. The solid oxide fuel cell comprises an anode; a cathode; and a ceramic electrolyte disposed between the anode and the cathode. The ceramic electrolyte is formed by the method comprising the steps of providing a ceramic electrolyte comprising a plurality of microcracks; infiltrating at least some of the plurality of microcracks with a liquid precursor comprising at least one oxidizable metal ion; and exposing the ceramic electrolyte to a base having a pH value of at least about 9, so as to chemically convert the oxidizable metal ion into an oxide, thereby decreasing the porosity of the ceramic electrolyte.

These and other features, aspects, and advantages of the present invention will become better understood when the following detailed description is read with reference to the accompanying drawings, in which like characters represent like parts throughout the drawings.

DETAILED DESCRIPTION OF THE INVENTION

Figure 1:
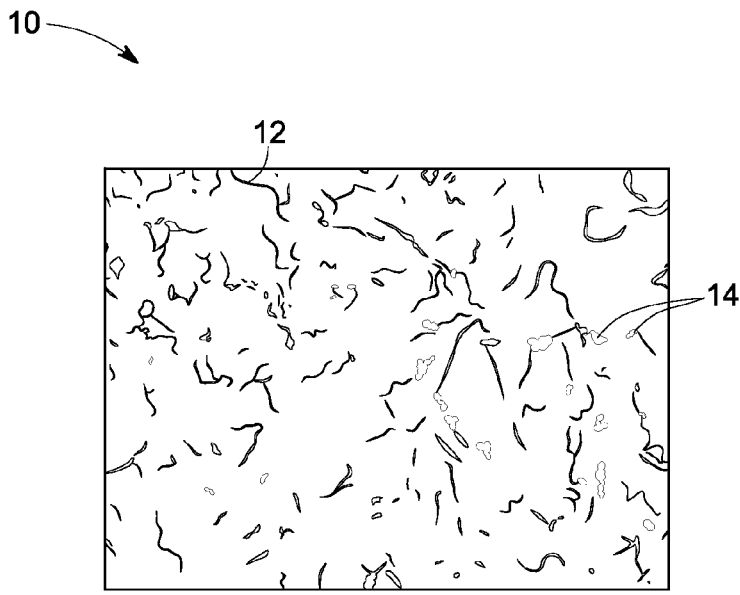
FIG. 1 shows a schematic of a ceramic layer, comprising a plurality of microcracks and pores.

In the following description, like reference characters designate like or corresponding parts throughout the several views shown in the figures. It is also understood that terms such as "top," "bottom," "outward," "inward," "first," "second," and the like are words of convenience, and are not to be construed as limiting terms. Furthermore, whenever a particular aspect of the invention is said to comprise or consist of at least one of a number of elements of a group and combinations thereof, it is understood that the aspect may comprise or consist of any of the elements of the group, either individually or in combination with any of the other elements of that group.

Typically, ceramic layers deposited by conventional deposition methods comprise many pores and microcracks. FIG. 1 shows a schematic representation of one such ceramic layer 10 containing microcracks 12 and pores 14. Such microcracks or pores present in ceramic layers may significantly affect their performance, especially when used as a ceramic electrolyte in a solid oxide fuel cell. Most of the methods developed so far to decrease the porosity of the ceramic layers, (increasing their density), and hence, to improve their performance, involve high temperature processing steps. The present inventors have developed a versatile method to fabricate a ceramic electrolyte having substantially reduced permeability, using reduced temperatures and minimizing the amount of thermal cycling. The details of the process are described in the subsequent embodiments.

Figure 2:
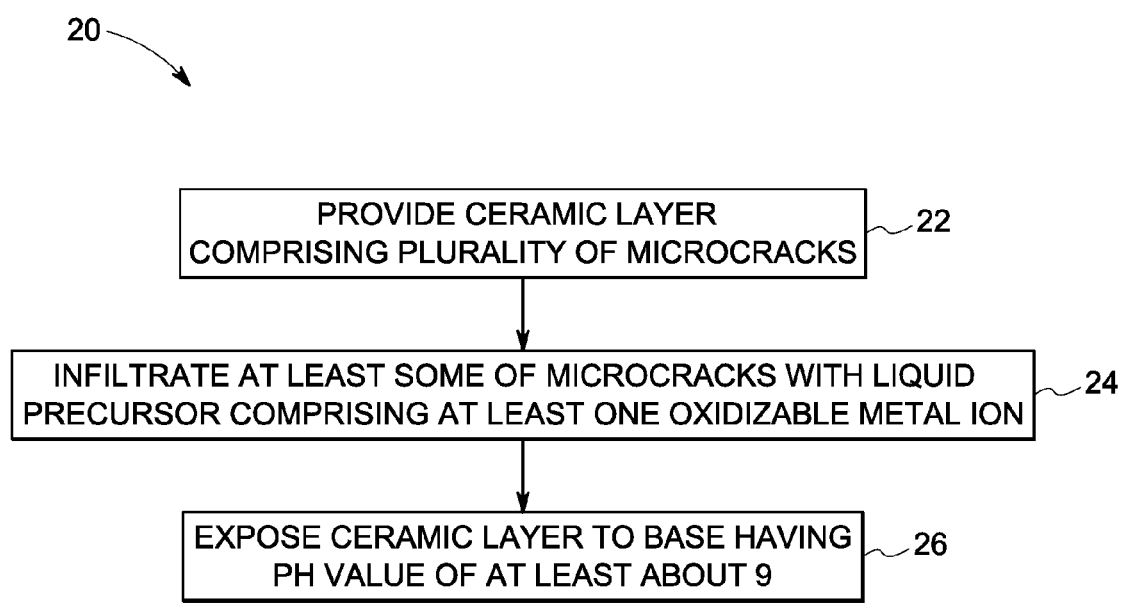
FIG. 2 is flow chart of a method for processing a ceramic electrolyte, according to one embodiment of the invention.

In one embodiment of the invention, a method of processing a ceramic layer is provided. FIG. 2 shows a flow chart of a method 20 of processing a ceramic layer. The method comprises: providing a ceramic layer comprising a plurality of microcracks, in step 22; infiltrating at least some of the plurality of microcracks with a liquid precursor comprising at least one oxidizable metal ion, in step 24; and exposing the ceramic layer to a base having a pH value of at least about 9, in step 26, so as to chemically convert the oxidizable metal ion into an oxide, thereby decreasing the porosity of the ceramic layer. Generally, the steps of infiltrating (step 24) and chemical conversion (step 26) are repeated at least once to achieve a desired decrease in the porosity of the ceramic layer. In some embodiments, it may involve repeating these steps several times. The required decrease in porosity may in part depend on the end-use application of the ceramic layer. In one embodiment, the desired decrease in porosity of the ceramic layer is at least by about 15%. In another embodiment, the desired decrease in porosity of the ceramic layer is at least by about 20%. In another embodiment, the desired decrease in porosity of the ceramic layer is at least by about 30%.

Typically, exposing the ceramic layer to a base comprises heating the ceramic layer in the presence of a base to a suitable temperature. The temperature to which the ceramic layer is heated may, in part, depend on the boiling point of the base and the pressure. For example, when the base comprises an aqueous base, heating of the ceramic layer comprises heating to a temperature in a range from about 60° C. to about 150° C., at ambient pressures. In another embodiment, the heating of the ceramic layer comprises heating to a temperature in a range from about 80° C. to about 120° C. When the base comprises an organic base, heating of the ceramic layer comprises heating to a temperature till about boiling point of the base. The low-temperature chemical conversion of metal ions into metal oxides advantageously prevents or mitigates the problems of delamination and related damages that are prone to occur at high temperatures.

In certain embodiments, pressure may also be utilized during chemical conversion of metal ions into metal oxides. Accordingly, in certain embodiments, exposing the ceramic layer to a base comprises applying a pressure. Increased pressure is expected to enhance the metal oxide formation. In one embodiment, the pressure applied is from about 100 kPa to about 130 MPa. In another embodiment, the pressure applied is from about 100 kPa to about 30 MPa. (The pressure can be applied within the confines of a vessel in which the treatment is being carried out, for example). The actual pressure applied may depend on the equipment used and other processing parameters. In certain embodiments, the ceramic layer is heated while being exposed to the base under pressure. The temperature and pressure relationships are well known in the art, and a person skilled in the art could readily determine the most appropriate would know how to choose the processing conditions, depending on the base material chosen. In one embodiment, exposing the ceramic layer to a base comprises exposing the ceramic layer to a base under pressure from about 60° C. to 300° C. Higher temperatures may be applied, depending, in part, on the decomposition temperatures of the precursors used.

In one embodiment, the ceramic layer comprises a ceramic electrolyte. The composition of the ceramic electrolyte, in part, depends on the end-use application. When the ceramic electrolyte is used in a solid oxide fuel cell, or in an oxygen or synthesis gas generator, the electrolyte may be composed of a material capable of conducting ionic species (such as oxygen ions or hydrogen ions), yet may have low electronic conductivity. When the ceramic electrolyte is used in a gas separation device, the ceramic electrolyte may be composed of a mixed ionic electronic conducting material. In all the above embodiments, the electrolyte may be desirably gas-tight to electrochemical reactants.

In general, for solid oxide fuel cell applications, the ceramic electrolyte has an ionic conductivity of at least about $10^{-3}$ S/cm, at the operating temperature of the device, and also has sufficiently low electronic conductivity. Examples of suitable ceramic materials include, but are not limited to, various forms of zirconia, ceria, hafnia, bismuth oxide, lanthanum gallate, thoria, and various combinations of these ceramics. In certain embodiments, the ceramic electrolyte comprises a material selected from the group consisting of yttria-stabilized zirconia, rare-earth-oxide-stabilized zirconia, scandia-stabilized zirconia, rare-earth doped ceria, alkaline-earth doped ceria, rare-earth oxide stabilized bismuth oxide, and various combinations of these compounds. In an exemplary embodiment, the ceramic electrolyte comprises yttria-stabilized zirconia. Doped zirconia is attractive because it exhibits substantially pure ionic conductivity over a wide range of oxygen partial pressure levels. In one embodiment, the ceramic electrolyte comprises a thermally sprayed yttria-stabilized zirconia. One skilled in the art would know how to choose an appropriate electrolyte, based on the requirements discussed herein.

In the case of an electrolytic oxygen separation device, oxygen is driven across the membrane by applying a potential difference and supplying energy. In such embodiments, the ceramic electrolyte may be chosen from electrolytes well-known in the art, such as yttria-stabilized zirconia (e.g., $(ZrO_2)_{0.92}(Y_2O_3)_{0.08}$, YSZ), scandia-stabilized zirconia (SSZ), doped ceria such as $(CeO_2)_{0.8}(Gd_2O_3)_{0.2}$ (CGO), doped lanthanum gallate such as $La_{0.8}Sr_{0.2}Ga_{0.85}Mg_{0.15}O_{2.285}$ (LSGM20-15), and doped bismuth oxide such as $(Bi_2O_3)_{0.75}(Y_2O_3)_{0.25}$, and the like.

In the case of a gas separation device, where partial pressures, rather than applied potential, are used to move ions across the electrolyte, the electrolyte may be a mixed ionic electronic conductor (MIEC). Examples of mixed ionic electronic conductors are $La_{1-x}Sr_xCoO_{3-\delta}$; ($1 \geq x \geq 0.10$)(LSC), $La_{1-x}Sr_xFeO_{3-\delta}$ ($0.8 > x > 0.1$), $SrCo_{1-x}Fe_xO_{3-\delta}$; ($0.3 \geq x \geq 0.20$), $La_{1-x}Sr_xCo_{1-y}Fe_yO_{3-\delta}$ ($0.8 \geq x \geq 0.2$, $0.8 \geq y \geq 0.2$) (LSCF); $LaNi_{0.6}Fe_{0.4}O_3$, and $Sm_{0.5}Sr_{0.5}CoO_3$ (SSC).

In step 22, the ceramic layer is provided by any suitable process. Some examples of suitable deposition processes include, but are not limited to, thermal spray, physical vapor deposition, electron beam physical vapor deposition, chemical vapor deposition, tape casting, screen-printing, and sol gel coating. Some examples of suitable thermal spray processes include, but are not limited to, air plasma spraying, flame spraying, vacuum plasma spray, low pressure plasma spray and detonation coating. Alternatively, the ceramic electrolyte layer may be deposited from a vapor phase such as physical vapor deposition (PVD), electron beam physical vapor deposition (EBPVD), or chemical vapor deposition (CVD). The ceramic layer may also be prepared by the tape casting or screen-printing of a slurry, followed by subsequent sintering. Layers manufactured with such processes often contain capillary spaces which are formed by pores and open microcrack structures, and which impair an intended function of the layer.

In an exemplary embodiment, the ceramic layer is deposited by an air plasma spray (APS) process. Plasma spray coatings are formed by heating a gas-propelled spray of a powdered metal oxide or a non-oxide material with a plasma spray torch. The spray is heated to a temperature at which the powder particles become molten. The spray of the molten particles is directed against a substrate surface, where they solidify upon impact to create the coating. The conventional as-deposited APS microstructure is typically characterized by a plurality of overlapping splats of material, wherein the inter-splat boundaries may be tightly joined, or may be separated by gaps resulting in some pores and microcracks. The ceramic layer may be applied by an APS process using equipment and processes known in the art. Those skilled in the art understand that the process parameters may be modified, depending on various factors, such as the composition of the electrolyte material, and the desired microstructure and thickness.

In step 24, at least some of the microcracks are infiltrated with a liquid precursor comprising at least one oxidizable metal ion. In certain embodiments, the liquid precursor is employed in the form of a solution. The solution may comprise any solvent, and a soluble salt material that allows formation of the solution. Some examples of suitable precursors include, but are not limited to, a halide, nitrate, an alcoholate, an acetate, a citrate, a ketonate, an isopropoxide, an alkoxy carboxylate, an acrylate, an amide, an azide, and an imide. In a particular embodiment, the liquid precursor comprises an aqueous nitrate solution.

The metals are present in the form of cations. The oxidizable ion chosen may depend on the composition of the ceramic layer. Some examples of oxidizable ions include, but are not limited to, Zr, Ce, Y, Sc, Gd, Sm, Eu, Pr, Ba, Fe, Al, Co, La, Mn, Ga, Mg, Ca, Sr, Ti, Hf, and Bi. The corresponding anions are inorganic compounds, for example nitrate $NO_3^-$, or organic compounds, for example alcoholates or acetates. If alcoholates are used, then chelate ligands, such as acetyl acetonate, may be advantageously added to decrease the hydrolysis sensitivity of the alcoholates. Examples of suitable solvents are toluene, acetone, ethanol, isopropanol, ethylene glycol, and water. Aqueous and alcohol solutions of nitrates, and organic-metallic soluble materials, such as acetates, and citrates, may also be used. The solution desirably has suitable wettability and solubility properties to permit infiltration into the pores and microcracks. Alternatively, molten precursor materials may also be utilized to infiltrate the microcracks. For example, molten nitrates may be used.

In step 26, the oxidizable metal ion is chemically converted into a metal oxide, by exposing the infiltrated ceramic layer to a suitable base. After infiltrating a desired portion of microcracks, the ceramic layer is exposed to the base, and the metal changes into the metal oxide, thereby closing the infiltrated microcracks. As used herein, "closing a selected number of microcracks" encompasses reducing the dimension of the cracks by filling the cracks, or by closing the surfaces of the cracks. Closing of the microcracks decreases the porosity, increases the density, and hence, decreases the permeability of the ceramic layer.

Any suitable base (basic agent) with a sufficiently high pH value may be chosen. In one embodiment, the base has a pH value of at least about 9. In another embodiment, the base has a pH value of at least about 10. In another embodiment, the base has a pH value of at least about 12. In some embodiments, a base that is free of contaminating ions (such as alkaline ions) is chosen. In a particular embodiment, the base comprises an organic base. Examples of suitable organic bases include, but are not limited to, an amine, an imine, or a hydroxide. In a particular embodiment, the hydroxide comprises tetra methyl ammonium hydroxide (TMAH). Tetra methyl ammonium hydroxide advantageously has a high pH value and a relatively low boiling point. In some specific embodiments, the infiltrated ceramic layer is exposed to vapors of the base, i.e., as a vapor phase reaction. For example, the reaction can be carried out at temperatures above the boiling point of the base. For pure organic bases such as TMAH in alcohol, the chemical conversion may happen at much lower temperatures, e.g., as low as ambient temperature. In certain embodiments, the method 20 may optionally comprise a step of heating the ceramic layer to a sufficient temperature and duration, so as to crystallize the metal oxide formed on chemical conversion in step 26. In embodiments where the chemically converted oxide comprises an ionic conductor, the step of crystallizing may advantageously increase the bulk conductivity of the ceramic layer significantly. In one embodiment, the increase in bulk conductivity may be by at least about 30%. In another embodiment, the increase in bulk conductivity may be by at least about 50%. The actual decrease in bulk conductivity, in part, depends on the composition of the metal oxide formed on chemical conversion, and the extent of crystallization. The crystallization temperatures of different metal oxides are known to one skilled in the art, or may be evaluated.

In a specific embodiment, the method comprises: providing a ceramic electrolyte, which itself comprises a plurality of microcracks; infiltrating the ceramic electrolyte with a liquid precursor comprising at least one oxidizable metal ion, to form an infiltrated ceramic electrolyte; exposing the infiltrated ceramic electrolyte to a base having a pH value of at least about 9, at temperatures less than about 120° C., so as to chemically convert the oxidizable metal ion into an oxide, thereby decreasing the porosity of the ceramic electrolyte. In a particular embodiment, the purpose of the decrease in the porosity of the ceramic electrolyte is to obtain a gas permeability, measured in air, of less than about $1 \times 10^{-10}$ $cm^2$ $Pa^{-1}$ $sec^{-1}$. The method is capable of yielding ceramic electrolytes with substantially low permeability and involves low processing temperature and hence mitigates or prevents the problems associated with high processing temperatures.

Figure 3:
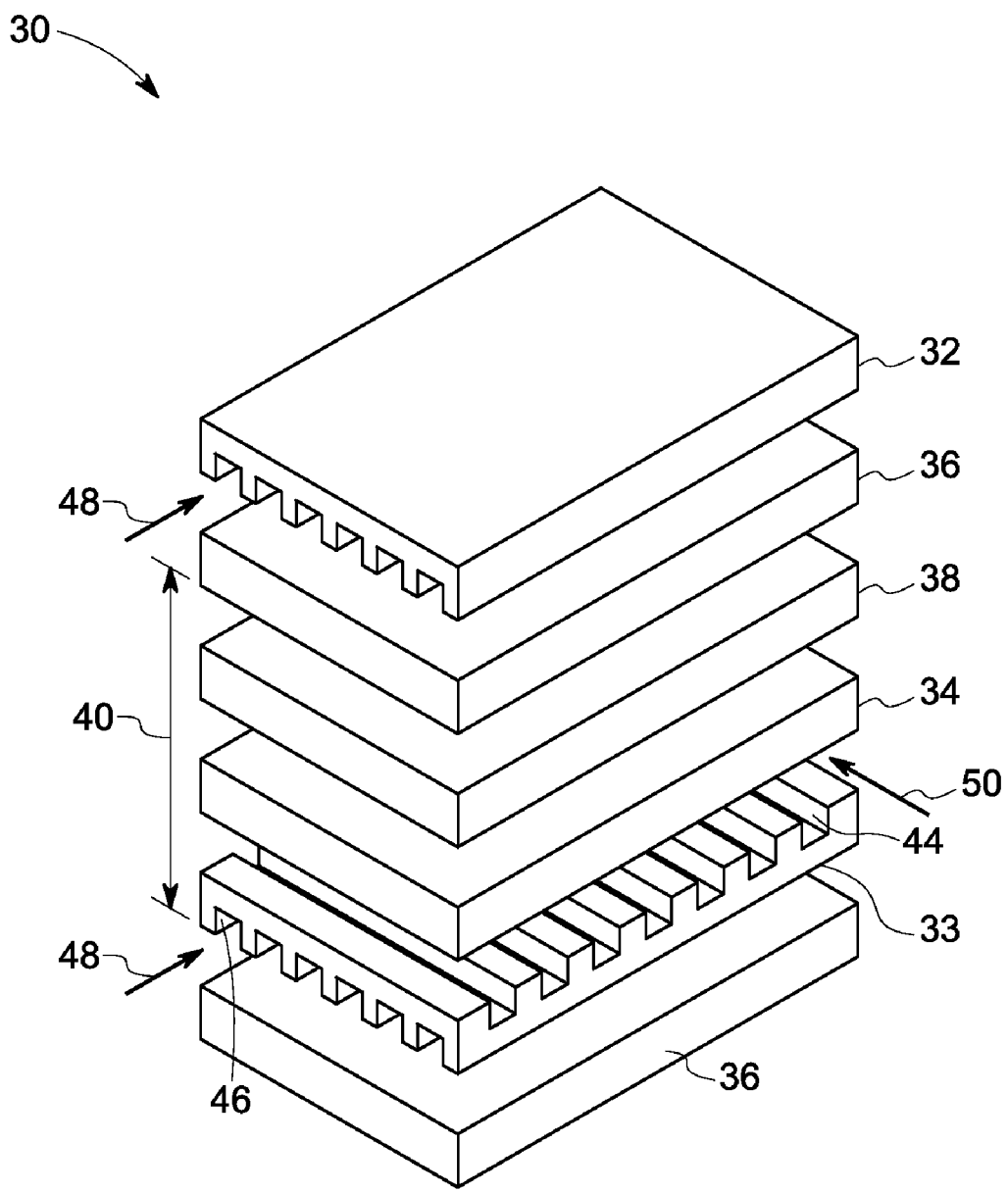
FIG. 3 is a schematic view of a solid oxide fuel cell comprising a ceramic electrolyte processed according to one embodiment of the invention.

Another embodiment of the invention is a solid oxide fuel cell (SOFC). A fuel cell is an energy conversion device that produces electricity by electrochemically combining a fuel and an oxidant across an ionic conducting layer. As shown in FIG. 3, an exemplary planar fuel cell 30 comprises interconnect portions 32 and 33, and a pair of electrodes—a cathode 34 and an anode 36, separated by a ceramic electrolyte 38. In general, this cell arrangement is well-known in the art, although the configuration depicted in the figure may be modified, e.g., with the cathode layer above the electrolyte, and the anode layer below the electrolyte. Those skilled in the art understand that fuel cells may operate horizontally, vertically, or in any orientation.

The interconnect portion 32 defines a plurality of airflow channels 44, in intimate contact with the cathode 34, and a plurality of fuel flow channels 46 in intimate contact with the anode 36 of an adjacent cell repeat unit 40, or vice versa. During operation, a fuel flow 48 is supplied to the fuel flow channels 46. An airflow 50, typically heated air, is supplied to the airflow channels 44. Interconnects 32 and 33 may be constructed in a variety of designs, and with a variety of materials. Typically, the interconnect is made of a good electrical conductor such as a metal or a metal alloy. The interconnect desirably provides optimized contact area with the electrodes.

Figure 4:
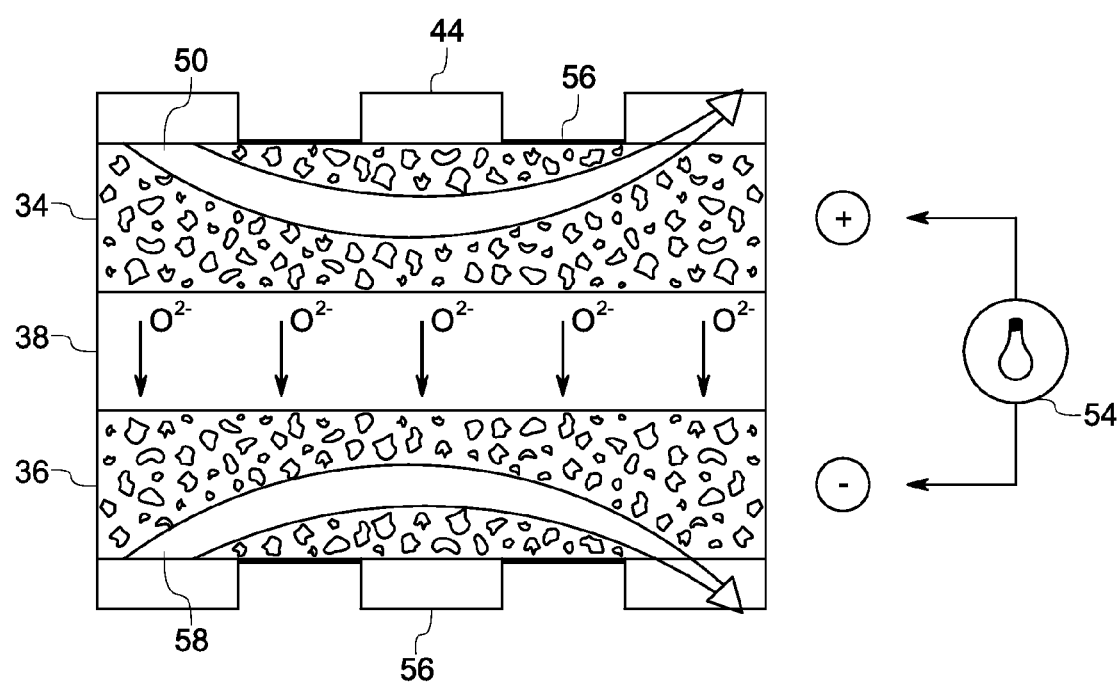
FIG. 4 illustrates an enlarged portion of an exemplary fuel cell assembly, showing the operation of the fuel cell.

FIG. 4 shows a portion of the fuel cell illustrating its operation. The fuel flow 58, for example natural gas, is fed to the anode 36, and undergoes an oxidation reaction. The fuel at the anode reacts with oxygen ions ($O^{2-}$) transported to the anode across the electrolyte. The oxygen ions ($O^{2-}$) are de-ionized to release electrons to an external electric circuit 54. The airflow 50 is fed to the cathode 34. As the cathode accepts electrons from the external electric circuit 54, a reduction reaction occurs. The electrolyte 38 conducts ions between the anode 36 and the cathode 34. The electron flow produces direct current electricity, and the process produces certain exhaust gases and heat.

In the exemplary embodiment shown in FIG. 3, the fuel cell assembly 30 comprises a plurality of repeating units 40, having a planar configuration. Multiple cells of this type may be provided in a single structure. The structure may be referred to as a "stack", an "assembly", or a collection of cells capable of producing a single voltage output.

The main purpose of the anode layer 36 is to provide reaction sites for the electrochemical oxidation of a fuel introduced into the fuel cell. In addition, the anode material is desirably stable in the fuel-reducing environment, and has adequate electronic conductivity, surface area and catalytic activity for the fuel gas reaction under operating conditions. The anode material desirably has sufficient porosity to allow gas transport to the reaction sites. The anode layer 36 may be made of any material having these properties, including but not limited to, noble metals, transition metals, cermets, ceramics and combinations thereof. Non-limiting examples of the anode layer material include nickel, nickel alloy, cobalt, Ni—YSZ cermet, Cu—YSZ cermet, Ni-Ceria cermet, or combinations thereof. In certain embodiments, the anode layer comprises a composite of more than one material.

The cathode layer 34 is typically disposed adjacent to the electrolyte 38. The main purpose of the cathode layer 34 is to provide reaction sites for the electrochemical reduction of the oxidant. Accordingly, the cathode layer 34 is desirably stable in the oxidizing environment; has sufficient electronic and ionic conductivity; has a surface area and catalytic activity for the oxidant gas reaction at the fuel cell operating conditions; and has sufficient porosity to allow gas transport to the reaction sites. The cathode layer 34 may be made of any materials meeting these properties, including, but not limited to, an electrically-conductive, and in some cases ionically-conductive, catalytic oxide such as, strontium doped $LaMnO_3$, strontium doped $PrMnO_3$, strontium doped lanthanum ferrites, strontium doped lanthanum cobaltites, strontium doped lanthanum cobaltite ferrites, strontium ferrite, $SrFeCo_{0.5}O_x$, $SrCo_{0.8}Fe_{0.2}O_{3-\delta}$; $La_{0.8}Sr_{0.2}Co_{0.8}Ni_{0.2}O_{3-\delta}$; $La_{0.7}Sr_{0.3}Fe_{0.8}Ni_{0.2}O_{3-\delta}$, and combinations thereof. A composite of such an electronically conductive, catalytically active material and an ionic conductor may be used. In certain embodiments, the ionic conductor comprises a material selected from the group consisting of yttria-stabilized zirconia, rare-earth-oxide-stabilized zirconia, scandia-stabilized zirconia, rare-earth doped ceria, alkaline-earth doped ceria, rare-earth oxide stabilized bismuth oxide, and various combinations of these compounds.

Typically, the electrolyte layer 38 is disposed between the cathode layer 34 and the anode layer 36. The main purpose of the electrolyte layer 38 is to conduct ions between the anode layer 36 and the cathode layer 34. The electrolyte carries ions produced at one electrode to the other electrode to balance the charge from the electron flow, and to complete the electrical circuit in the fuel cell. Additionally, the electrolyte separates the fuel from the oxidant in the fuel cell. Typically, the electrolyte 38 is substantially electrically insulating. Accordingly, the electrolyte 38 is desirably stable in both the reducing and oxidizing environments, impermeable to the reacting gases, adequately ionically conductive at the operating conditions, and compliant with the adjacent anode 36 and cathode 34.

In some embodiments of the present invention, as discussed above, the ceramic electrolyte is processed by a method comprising: providing a ceramic electrolyte, which itself comprises a plurality of microcracks; infiltrating the ceramic electrolyte with a liquid precursor comprising at least one oxidizable metal ion, to form an infiltrated ceramic electrolyte; exposing the infiltrated ceramic electrolyte to a base of sufficiently high pH value, so as to chemically convert the oxidizable metal ion into an oxide at a temperature less than about 120° C., thereby reducing gas permeability of the ceramic electrolyte. Typically, the steps of infiltrating and exposing are repeated at least once. In some embodiments, these steps may be repeated several times until a desired decrease in gas permeability of the ceramic layer is achieved. The desired decrease in gas permeability of the ceramic electrolyte comprises decreasing gas permeability to a value, measured in air, of less than about $1 \times 10^{-10}$ $cm^2$ $Pa^{-1}$ $sec^{-1}$. The ceramic electrolyte may have any suitable composition, including those listed in the embodiments discussed previously. In a particular embodiment, the ceramic electrolyte comprises yttria-stabilized zirconia. The composite ceramic electrolyte has a gas permeability, measured in air, of less than about $1 \times 10^{-10}$ $cm^2$ $Pa^{-1}$ $sec^{-1}$. The ceramic electrolytes described for embodiments of the present invention have substantially high compliance, and superior gas-tight characteristics. These features provide distinct advantages over conventionally deposited ceramic electrolytes.

The anode, cathode, and electrolyte layers are illustrated as single layers for purposes of simplicity of explanation. It should be understood, however, that the anode layer may be formed from single or multiple layers, in which the particle size can be graded through the depth of the anode. The composition of the material may also be graded, e.g., for thermal compatibility purposes.

In another example, the electrolyte structure may be used for a tubular geometry. Furthermore, though the operation of the cell is explained with a simple schematic, embodiments of the present invention are not limited to this particular simple design. Various other designs—some of them complex—are also applicable, as will be appreciated by those skilled in the art. For example, in certain embodiments, the fuel cell may comprise a composite electrode-electrolyte structure, rather than individual electrode (anode/cathode) and electrolyte layers. Such composite structures may also be incorporated with electrocatalytic materials such as $La_{1-x}Sr_xMnO_3$ (LSM), $La_{1-x}Sr_xCoO_3$ (LSC), $La_{1-x}Sr_xFeO_3$ (LSF), $La_{1-x}Sr_xCo_{1-y}Fe_yO_3$ (LSCF), $SrFeCo_{0.5}O_x$, $SrCo_{0.8}Fe_{0.2}O_{3-\delta}$; $La_{0.8}Sr_{0.2}Co_{0.8}Ni_{0.2}O_{3-\delta}$; and $La_{0.7}Sr_{0.3}Fe_{0.8}Ni_{0.2}O_{3-\delta}$, to enhance their performance. The fuel cell may also comprise additional layers, such as buffer layers, support layers, and the like, helping to better match the coefficient of thermal expansion (CTE) of the layers. In addition, barrier layers may be included in the fuel cell, e.g., to prevent detrimental chemical reactions from occurring during operation. These layers may be in various forms, and may be prepared by various known techniques. For example, the buffer/support layers may be a porous foam or tape, or in the form of a knitted wire structure.

The embodiments of the present invention are fundamentally different from those conventionally known in the art. There have been reports of infiltrating porous ceramic layers with metal ions, and heat treating them in order to densify the ceramic layer. In such cases, the ceramic layers are heated to temperatures between 500° C. and 800° C. As discussed above, when the ceramic electrolyte layers are disposed on metals at high oxygen partial pressures, high processing temperatures may lead to unwanted oxidation. Oxidation and thermal cycling may also cause serious problems of delamination of the electrolyte. In the present instance, the inventors have conceived unique techniques for the chemical conversion of infiltrated metal ions to metal oxides, and have successfully demonstrated low temperature processing of ceramic layers to achieve desirably low permeability values.

The following examples serve to illustrate the features and advantages offered by the present invention, and are not intended to limit the invention thereto.

Example

Processing of Yttria Stabilized Zirconia Ceramic Layer

A yttria stabilized zirconia (YSZ) APS electrolyte (having a thickness of 65 microns) was first deposited onto a one inch (2.54 cm)-diameter porous stainless steel substrate, and had a permeability (measured in air) of $7.3 \times 10^{-10}$ cm $Pa^{-1}$ $sec^{-1}$. One molar gadolinium nitrate and cerium nitrate aqueous precursor solutions were prepared and mixed in the appropriate ratios to yield a $Gd_{0.20}Ce_{0.80}$oxide (20 GDC) final composition after nitrate decomposition. The nitrate solution was painted on the 8 YSZ APS coating at a loading of approximately 3.5 $mg/cm^2$, air dried at room temperature under vacuum, then at 70° C. in air for approximately 5 minutes each, then placed into a sealed glass tube which was connected to a volumetric flask containing tetra methyl ammonium hydroxide (TMAH). The TMAH was heated until boiling, causing the basic vapor to flow over the infiltrated substrate that was heated to 80° C., to promote the chemical conversion of nitrates to oxides. After 20 minutes, the sample was removed. The infiltration and chemical reaction sequence was repeated 5 times. A 20 GDC oxide with small crystallite sizes (as suggested by the broad reflective peaks) was observed using x-ray diffraction (XRD) on the electrolyte, indicating that the low temperature chemical decomposition of the nitrate to 20 GDC had occurred. The sample was then thermally cycled to 500° C. and back to room temperature, to simulate a high temperature environment to which a solid oxide fuel cell may be exposed during operation. After the densification of the infiltrate, the gas permeability (measured in air) was $1.3 \times 10^{-10}$ cm$^2$ Pa$^{-1}$ sec$^{-1}$. Additional infiltrations and chemical conversions were conducted to decrease the permeability further.

While the invention has been described with reference to exemplary embodiments, it will be understood by those skilled in the art that various changes may be made, and equivalents may be substituted for elements thereof, without departing from the scope of the invention. In addition, many modifications may be made to adapt a particular situation or material to the teachings of the invention, without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method comprising:
   providing a ceramic layer comprising a plurality of microcracks;
   infiltrating at least some of the plurality of microcracks with a liquid precursor comprising at least one oxidizable metal ion; and
   exposing the ceramic layer to a base having a pH value of at least about 9, so as to chemically convert the oxidizable metal ion into an oxide within the microcracks, thereby decreasing the porosity of the ceramic layer.

2. The method of claim 1, wherein the steps of infiltrating and chemical conversion are repeated at least once, to achieve a desired decrease in the porosity of the ceramic layer.

3. The method of claim 2, wherein the desired decrease in porosity of the ceramic layer is by at least about 15%.

4. The method of claim 1, wherein exposing the ceramic layer to a base comprises heating the ceramic layer in the presence of a base to a temperature in a range from about 60° C. to about 150° C.

5. The method of claim 4, wherein the heating of the ceramic layer comprises heating to a temperature in a range from about 80° C. to about 120° C.

6. The method of claim 1, wherein exposing the ceramic layer to a base comprises applying a pressure.

7. The method of claim 6, wherein the ceramic layer is heated while being exposed to the base under pressure.

8. The method of claim 6, wherein the pressure is in a range from about 100 kilo pascals to about 130 mega pascals.

9. The method of claim 8, wherein the pressure is in a range from about 100 kilo pascals to about 30 mega pascals.

10. The method of claim 7, wherein the ceramic layer is heated to a temperature in a range from about 60° C. to about 300° C.

11. The method of claim 1, wherein the ceramic layer comprises a ceramic electrolyte.

12. The method of claim 11, wherein the ceramic electrolyte comprises a material selected from the group consisting of yttria-stabilized zirconia, rare-earth-oxide-stabilized zirconia, scandia-stabilized zirconia, rare-earth doped ceria, alkaline-earth doped ceria, stabilized hafnia, rare-earth oxide stabilized bismuth oxide, and lanthanum strontium magnesium gallate.

13. The method of claim 11, wherein the ceramic electrolyte comprises yttria-stabilized zirconia.

14. The method of claim 1, wherein providing the ceramic layer comprises formation of the ceramic layer by a method selected from the group consisting of thermal spraying, physical vapor deposition, electron beam physical vapor deposition, chemical vapor deposition, tape casting, screen-printing, and sol gel coating.

15. The method of claim 14, wherein thermal spraying comprises a method selected from the group consisting of air plasma spraying, flame spraying, vacuum plasma spray, low pressure plasma spray and detonation coating.

16. The method of claim 14, wherein thermal spraying comprises air plasma spraying.

17. The method of claim 1, wherein the liquid precursor comprises at least one material selected from the group consisting of a halide, a nitrate, an alcoholate, an acetate, a citrate, a ketonate, an isopropoxide, an alkoxy carboxylate, an acrylate, an amide, an azide, and an imide.

18. The method of claim 1, wherein the liquid precursor comprises a nitrate.

19. The method of claim 1, wherein the oxidizable metal ion comprises at least one ion selected from the group consisting of Zr, Ce, Y, Sc, Gd, Sm, Eu, Pr, Ba, Fe, Al, Co, La, Mn, Ga, Mg, Ca, Sr, Ti, Hf, and Bi.

20. The method of claim 1, wherein the base has a pH value of at least about 12.

21. The method of claim 1, wherein the base comprises an organic base.

22. The method of claim 21, wherein the organic base comprises at least one base selected from the group consisting of an amine, an imine, and a hydroxide.

23. The method of claim 22, wherein the hydroxide comprises tetra methyl ammonium hydroxide.

24. The method of claim 1, wherein the ceramic layer is exposed to vapors of the base, so as to chemically convert the oxidizable metal ion into an oxide.

25. The method of claim 1, further comprising heating the ceramic layer to a sufficient temperature and duration after the chemical conversion step, so as to crystallize chemically-converted oxide, and thereby increase the bulk conductivity of the ceramic layer by at least about 30%.

26. A method comprising:
   providing a ceramic electrolyte, which itself comprises a plurality of microcracks;
   infiltrating the ceramic electrolyte with a liquid precursor comprising at least one oxidizable metal ion to form an infiltrated ceramic electrolyte;
   exposing the infiltrated ceramic electrolyte to a base having a pH value of at least about 9 at temperatures less than about 120° C., so as to chemically convert the oxidizable metal ion into an oxide, thereby decreasing the porosity of the ceramic electrolyte.

27. The method of claim 26, wherein, the porosity of the ceramic electrolyte is decreased to the extent necessary to obtain a gas permeability, measured in air, of less than about 1×10-10 cm2 Pa-1 sec-1.

* * * * *